Patented Nov. 15, 1938

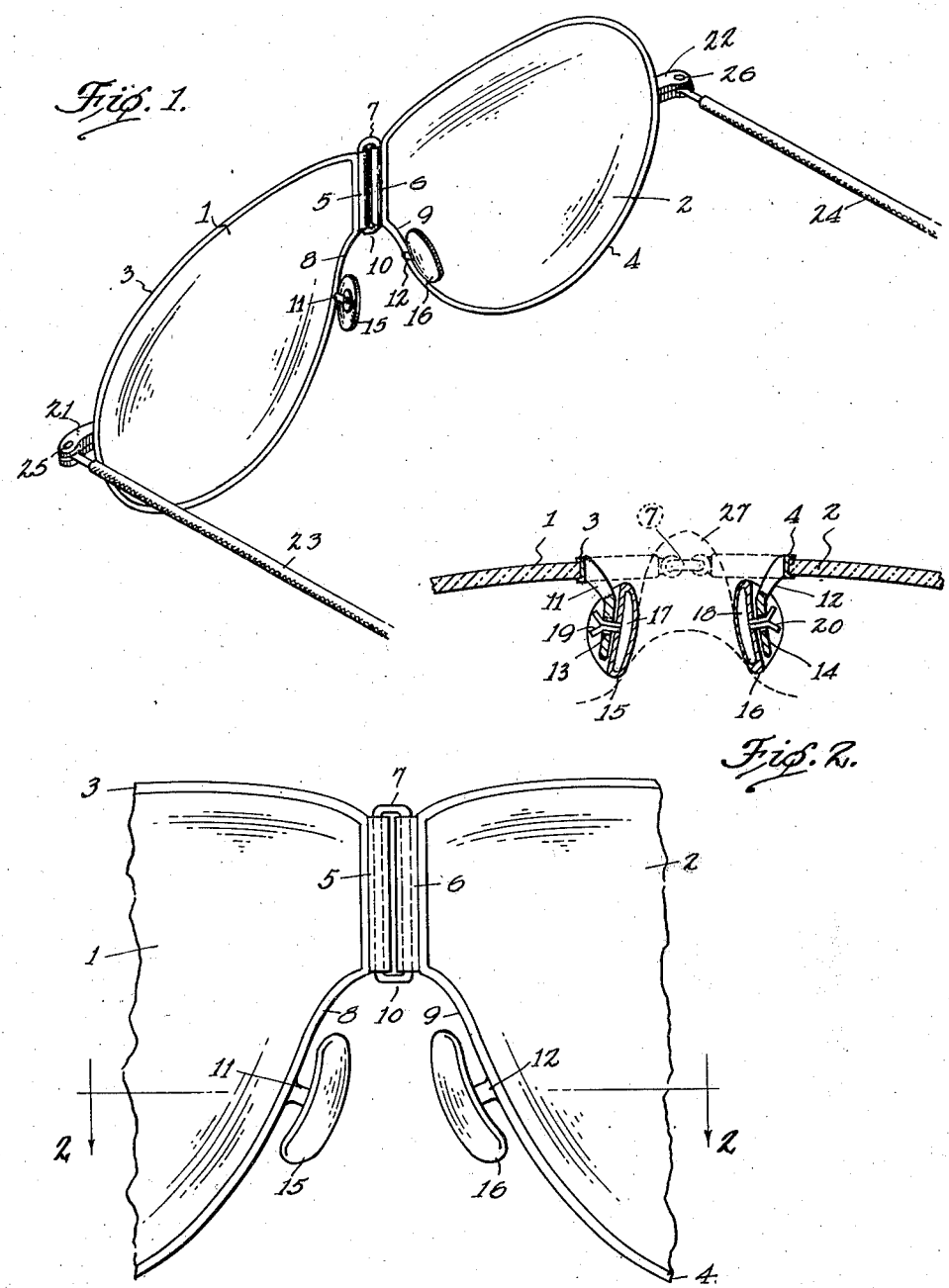

2,136,679

UNITED STATES PATENT OFFICE 2,136,679

SPECTACLE AND EYEGLASS FRAME OR MOUNTING

Arthur E. Euler, Oakland, Calif.

Application March 25, 1936, Serial No. 70,839

1 Claim. (Cl. 88—43)

My invention relates to improvements in spectacle and eyeglass frames or mountings, and it consists of the combinations, constructions and arrangements hereinafter described and claimed.

An object of my invention is to provide a spectacle and eyeglass frame or mounting designed for ophthalmic lenses in which the bridge construction consists of a hinge and a double curvature in the rim formation together closely following the contour of the nose, the rims integrally carrying arms at the points where the double curvatures branch in opposite directions, which arms, in turn, rockably support pads designed to rest upon the nose of the wearer. The combined hinge arrangement for the bridge and the swiveling of the pads allows full flexibility of the front of the glasses when necessary due to motion and vibration of the head. This eliminates soreness to the wearer, which is usually experienced from rigid spectacle or eyeglass frames.

My invention is adapted for use with spectacles and eyeglass frames, and also is adapted for use with eyeglass mountings. By spectacles I mean a device consisting of two glass lenses set in a frame that rests on the nose and is held in place by pieces passing over or around the ears. The device also can be used on eyeglasses which do not make use of bows for the ears, but instead make use of a spring which compresses pads against the nose for supporting the device. It also should be borne in mind that the lenses may be mounted in a rim, or may be rimless.

The device is particularly designed for large lenses and the pads are used for supporting the lenses. The device is extremely simple in construction, and provides a pair of spectacles or eyeglasses which are flexible, and which can be adjusted quickly to the convenience of the wearer.

Other objects and advantages will appear in the following specification, and the novel features of the device will be particularly pointed out in the appended claim.

My invention is illustrated in the accompanying drawing forming a part of this application, in which Figure 1 is an isometric view of the eyeglasses;

Figure 2 is a section along the line 2—2 of Figure 3; and

Figure 3 is an enlarged view of a part of the device.

In carrying out my invention I provide two generally oval lenses 1 and 2 that are mounted in correspondingly shaped rims 3 and 4. The rims have hinge knuckles 5 and 6 which are connected by a closed loop 7. The portions 8 and 9 of the rims are formed on a double curvature, the double curvatures and hinge providing a bridge construction 10.

The rims 3 and 4 also carry guard arms 11 and 12 which are integrally joined to the rims at points substantially where the double curvatures branch in opposite directions. Figure 2 shows these arms as being provided with openings 13 and 14. Pads 15 and 16 cover supporting heads 17 and 18, collectively herein known as nose pads, and these heads in turn have shanks 19 and 20 that are in the shape of spring legs the outer ends of which legs are bent away from each other for holding the pads to the arms while permitting a swivel or rocking motion between the pads and the arms.

Figure 1 also shows the rims 3 and 4 carrying projections 21 and 22 and temples 23 and 24 are hinged to the projections at 25 and 26 respectively.

From the foregoing description of the various parts of the device, the operation thereof may be readily understood.

The hinge, generally represented by the closed loop 7 is a double hinge as indicated at 5 and 6, and the actual hinging may be along a median line of the head, or to the right or left of this line. The bridge construction 10 consisting of the closed loop 7, hinge knuckles 5, 6 and the double curvatures 8, 9 mutually contribute toward a configuration which follows the contour of the wearer's nose but is amply spaced therefrom to avoid heating and binding. But a secure anchorage is afforded the nose pads 17, 18, because the guard arms 11, 12 that carry them extend toward each other so as to locate their terminals close to the sides of the nose. The hinging of the two lenses relieves the possibility of breakage due to any strain in handling. The pair of arms with the pivotal guards or pads 15 and 16 support the lens weight on the nose 27, shown by dotted lines in Figure 2, while still affording full flexibility of the front and entire glasses when necessary. The device also maintains the proper alignment of the glasses of the wearer and gives comfort to the actual wearing because of the universal adjustment of the glasses in all directions.

The device adapts itself to any size, shape or contour of the nose because of the foregoing bridge construction, and the arms 11 and 12 may be adjusted by means of pliers to give any desirable angle. The lenses are disposed the necessary distance from the eyes, and this will afford ventilation and prevent the accumulation of perspiration on the glasses. The hinged bridge 10 cooperating with the swivel or rocking pads 15 and 16 gives a universal adjustment and superior wearing qualities. I do not wish to be confined to any particular hinge, nor to any particular type of mounting for the pads 15 and 16. The gist of the invention lies in the coaction between the hinge 7 and the rocking pads 15 and 16.

While I have shown only the preferred form of my invention, it should be understood that various changes or modifications may be made within the scope of the appended claim without departing from the spirit of the invention.

I claim:

An eyeglass and spectacle frame comprising two generally oval lens rims which have temples at their remote ends and hinge knuckles at their near ends, said frame embodying a bridge construction which consists of a closed loop that connects the hinge knuckles and a double curvature in the bottoms of the rims the adjacent curvature components converging toward the hinge knuckles, the resulting configuration following the contour of the nose but being amply spaced therefrom, guard arms integral with the rims at points substantially where the double curvatures branch in opposite directions, said guard arms extending toward each other so as to locate their terminals close to the sides of the nose, and a pair of nose pads, each having means for movably connecting them to the arm terminals.

ARTHUR E. EULER.